US009158331B2

(12) United States Patent
Zhou et al.

(10) Patent No.: US 9,158,331 B2
(45) Date of Patent: Oct. 13, 2015

(54) ON-DEMAND SCALABLE TIMER WHEEL

(71) Applicant: Microsoft Corporation, Redmond, WA (US)

(72) Inventors: Ziyan Zhou, Issaquah, WA (US); Ivan D. Pashov, Woodinville, WA (US); Jonathan A. Silvera, Seattle, WA (US); Matthew R. Cox, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 356 days.

(21) Appl. No.: 13/852,875

(22) Filed: Mar. 28, 2013

(65) Prior Publication Data

US 2014/0298073 A1 Oct. 2, 2014

(51) Int. Cl.
 *G06F 1/04* (2006.01)
 *G06F 1/14* (2006.01)
 *G06F 9/48* (2006.01)

(52) U.S. Cl.
 CPC ............... *G06F 1/14* (2013.01); *G06F 9/4825* (2013.01); *G06F 9/4837* (2013.01); *G06F 9/4843* (2013.01)

(58) Field of Classification Search
 CPC ........... G06F 1/14; G06F 1/32; G06F 9/4825; G06F 9/4837; G06F 9/4843
 USPC .................................................. 713/300, 320
 See application file for complete search history.

(56) References Cited

U.S. PATENT DOCUMENTS

| 5,768,572 | A | 6/1998 | George et al. |
| 6,115,826 | A | 9/2000 | Kinkade |
| 6,360,329 | B1 | 3/2002 | Kinkade |
| 6,718,479 | B1 | 4/2004 | Christenson |
| 7,801,092 | B2 | 9/2010 | Meier |
| 8,055,918 | B2 | 11/2011 | McKenney et al. |
| 8,307,030 | B1 * | 11/2012 | Hu ................................. 709/203 |

OTHER PUBLICATIONS

"Kernel Timer Systems", Retrieved from <http://elinux.org/Kernel_Timer_Systems> on Feb. 15, 2013, (Oct. 27, 2011), 5 pages.
Jeremy "Linux: High-Res Timers and Tickless Kernel", Retrieved from <http://kerneltrap.org/node/6750> on Feb. 15, 2013, (Jun. 23, 2006), 11 pages.
Venkatsubra, et al., "Implement Lower Timer Granularity for Retransmission of TCP", Retrieved from <http://www.ibm.com/developerworks/aix/library/au-lowertime/?ca=dgr-lnxw06tcptimers&S_TACT=AGX59&S_CMP=GR> on Feb. 15, 2013, (Oct. 9, 2007), 5 pages.

(Continued)

*Primary Examiner* — Mark Connolly
(74) *Attorney, Agent, or Firm* — Jim Banowsky; Kate Drakos; Micky Minhas

(57) ABSTRACT

Various embodiments enable on-demand scaling of a timer wheel. Some embodiments dynamically start and stop a timer wheel based, at least in part, on whether the timer wheel has any associated active timers. In some cases, the timer wheel is suspended when all associated active timers have been serviced. Alternately or additionally, the timer wheel is re-activated upon associating one or more active timers in need of service to the timer wheel. Various embodiments enable addition and removal of timer(s) to the timer wheel and/or various time slots associated with the timer wheel without using a global lock associated with the timer wheel.

20 Claims, 6 Drawing Sheets

(56) References Cited

OTHER PUBLICATIONS

Zhong, et al., "On-Demand Time Synchronization with Predictable", *Proceedings of IEEE INFOCOM*, (Apr. 10, 2011), pp. 1-9.

"International Search Report & Written Opinion for PCT Patent Application No. PCT/US2013/059330", Mailed Date: Dec. 12, 2013, Filed Date: Sep. 12, 2013, 8 Pages.

\* cited by examiner

ON-DEMAND SCALABLE TIMER WHEEL

BACKGROUND

Computing devices oftentimes use timers as a fundamental processing tool. For example, a timer can be used to measure how long it takes a task to complete processing, interrupt a task that is blocked after a pre-determined amount of time (e.g. a timeout timer), wake up process(es), and so forth. As computing devices (and the applications they run) become more and more complex, the usage of timers typically increases. One way to handle a multitude of timers running on a system efficiently is through the use of a timer wheel.

Among other things, a timer wheel groups timers into different time slots to be processed collectively. Sometimes when timers are added and removed to time slot(s), a global lock on the timer can be used to as a way to regulate the state of the timer wheel. When the timer wheel advances to a particular time slot on the wheel, the timers in that associated time slot are serviced. For example, at the start of each time slot, the timer wheel algorithms wake up, look for any associated timers contained within the associated time slot, potentially service at least some timers located in the time slot, and then block and/or wait for the start of the next time slot. This process can repeat itself indefinitely until the timer wheel is deleted and/or removed. The process of the timer wheel continuously waking up and checking for any timers in need of servicing, utilizes a central processing unit's (CPU) time and/or processing power, regardless of whether timers in need of service exist in and of the timer wheel's associated time slots. This, in turn, can affect the battery life of an associated computing device. When the timer wheel contains timers, these resources are directed towards active applications and/or processing. However, when the timer wheel is void of any timers, the repetitive nature of waking up each time slot and checking for non-existent timers can unnecessarily drain these resources. Further, using a global lock on a timer wheel with multiple timers can sometimes introduce a bottleneck and/or slowdown in performance due to delayed acquisition of the global lock.

SUMMARY

This Summary is provided to introduce a selection of concepts in a simplified form that are further described below in the Detailed Description. This Summary is not intended to identify key features or essential features of the claimed subject matter.

Various embodiments enable on-demand scaling of a timer wheel. Some embodiments dynamically start and stop a timer wheel based, at least in part, on whether the timer wheel has any associated active timers. In some cases, the timer wheel is suspended when all associated active timers have been serviced. Alternately or additionally, the timer wheel is re-activated upon associating one or more active timers in need of service to the timer wheel Various embodiments enable addition and removal of timer(s) to the timer wheel and/or various time slots associated with the timer wheel without using a global lock associated with the timer wheel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments enable on-demand scaling of a timer wheel. A timer wheel can be instantiated for one or more applications. The instantiated timer wheel can then be dynamically started and stopped based, at least in part, on whether the timer wheel has any associated active timers. In some cases, the timer wheel can be figured to continuously process time slots, and any associated active timers of the time slots, while the timer wheel contains un-serviced active timers. Upon servicing all of the associated active timers, some embodiments suspend execution of the instantiated timer wheel until an active timer is added to the timer wheel and/or the timer wheel is deleted. The timer wheel can then be re-activated and configured to execute continuously until all associated active timers are again serviced. Further, one or more timers can be added and removed to the timer wheel without the use of a global lock associated with the timer wheel, thus enabling more efficient and scalable processing associated with the timer wheel.

In the discussion that follows, a section entitled "Example Operating Environment" is provided and describes one environment in which one or more embodiments can be employed. Following this, a section entitled "On-Demand Scalable Timer Wheels" describes dynamically starting and stopping a timer wheel in accordance with one or more embodiments. Last, a section entitled "Example Device" describes an example device that can be utilized to implement one or more embodiments Having provided an overview of various embodiments that are to be described below, consider now an example operating environment in which one or more embodiments can be implemented.

Example Operating Environment

Figure 1:
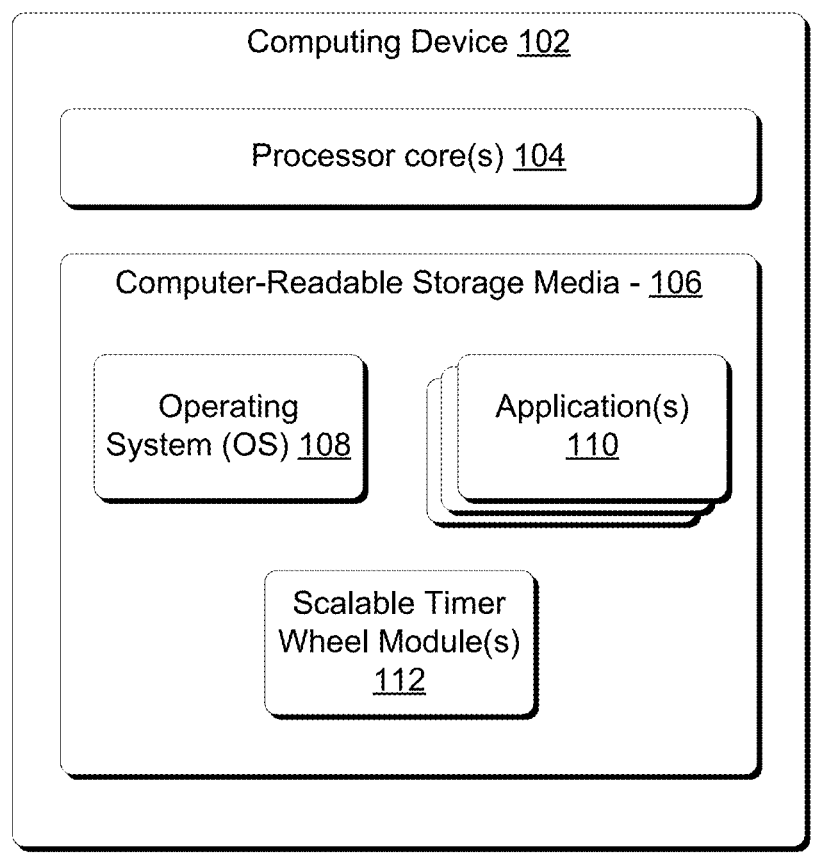
FIG. 1 is an illustration of an environment computing device in accordance with one or more embodiments.

FIG. 1 is an illustration of an example computing device that is operable to employ the techniques described in this document. The illustrated example includes computing device 102 that may be configured in a variety of ways. For example, computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth. Thus, computing device 102 may range from full resource devices with substantial memory and processor resources (e.g., personal computers, game consoles) to a low-resource device with limited memory and/or processing resources (e.g., traditional set-top boxes, handheld game consoles). Computing device 102 also includes software that causes computing device 102 to perform one or more operations as described below.

Among other things, computing device 102 includes processor core(s) 104. Processor core(s) 104 represents functionality that can execute machine-level processor instructions, such as branch, jump, add, subtract, move data, and so forth. Alternately or additionally, processor core(s) 104 is configured to execute processor instructions in parallel with the other processor cores associated with computing device 102. Thus, computing device 102 can range from a single processor computing device, to a multi-core/multi-processor computing device.

Computing device 102 also includes one or more computer-readable storage media 106. The computer-readable storage media can include, by way of example and not limitation, all forms of volatile and non-volatile memory and/or storage media that are typically associated with a computing device. Such media can include ROM, RAM, flash memory, hard disk, removable media and the like. Among other things, computer-readable storage media 106 includes operating system 108, application(s) 110, and scalable timer wheel module(s) 112. While illustrated as separate modules, it is to be appreciated that these modules can be implemented as separate modules, combined modules, or any combination thereof without departing from the scope of the claimed subject matter. For example, in some embodiments, scalable timer wheel module(s) 112 can be implemented as a sub-module of operating system 108 and/or application(s) 110.

Operating system (OS) 108 represents, among other things, functionality configured to manage software and/or hardware resource(s) of computing device 102. Alternately or additionally, operating system 108 can provide one or more libraries of functionality utilized by application(s) 110 and/or scalable timer wheel module 112. This can be done in any suitable manner, such as one module or several modules working in concert.

Application(s) 110 represent one or more applications comprising instructions that can be executed by processor core(s) 104. Application(s) 110 can include high level application(s) with functionality to interact with a user of computing device 102, can include processor core instructions associated with a software thread, and/or can include instructions associated with low level application(s) that interact with low-level and/or rudimentary aspects of computing device 102, such as driver software, interrupt service routines, and so forth. Alternately or additionally, application(s) 110 can utilize functionality provided by operating system 108 and/or scalable timer wheel module(s) 112. Thus, application(s) 110 can include a wide range of application(s).

Scalable timer wheel module(s) 112 represents functionality configured to enable processing multiple timers using a dynamic timer wheel. Among other things, the dynamic timer wheel can be configured to continuously execute and/or enable servicing active timers associated with the dynamic timer wheel. As part of its continuous execution, the dynamic timer wheel can periodically wake up at pre-defined time intervals to identify and/or process the active timer(s). In some embodiments, the dynamic timer wheel suspends its execution when all active timers associated with the dynamic timer wheel have been serviced. Further, the dynamic timer wheel can, in some cases, re-activate its execution responsive to the addition of one or more timers to the timer wheel. Scalable timer wheel module(s) 112 can be implemented in any suitable manner. For example, scalable timer wheel module(s) 112 can implement a dynamic timer wheel as a hashed timer wheel, a circular array timer wheel, a hierarchical timing wheel, and so forth.

Figure 2:
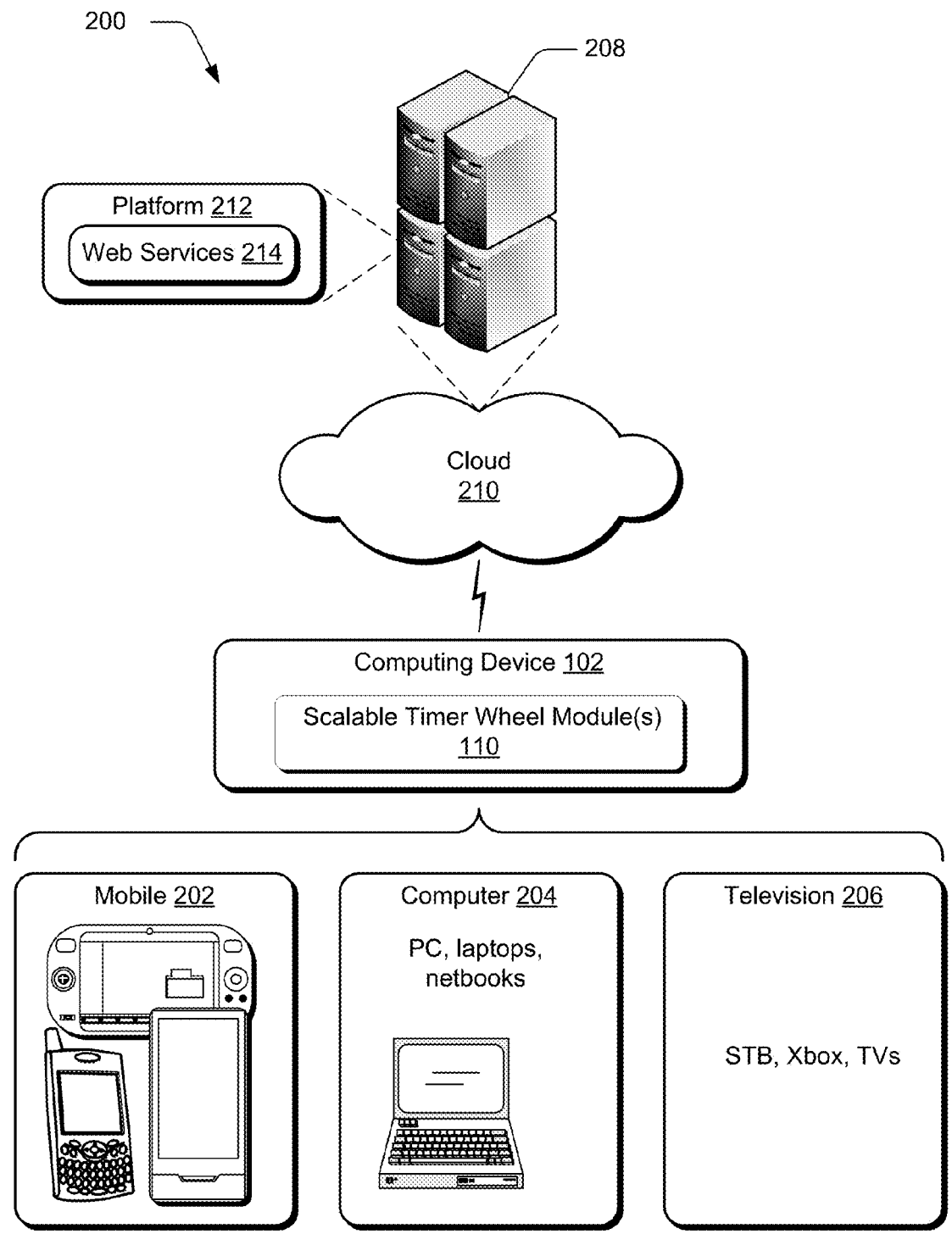
FIG. 2 is an illustration of an example operating environment in accordance with one or more embodiments.

FIG. 2 illustrates an example system 200 generally showing computing device 102 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described, computing device 102 may be configured in a variety of different ways, such as for mobile 202, computer 204, and television 206 uses. Each of these configurations has a generally corresponding screen size and thus computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of device that involve display in a casual environment, e.g., televisions, set-top boxes, game consoles, and so on. Thus, the techniques described herein may be supported by these various configurations of the computing device 102 and are not limited to the specific examples described in the following sections. As illustrated here, computing device 102 can include scalable timer wheel module(s) 112 as described above and below.

In some embodiments, server(s) 208 include "cloud" functionality. Here, cloud 210 is illustrated as including a platform 212 for web services 214. The platform 212 abstracts underlying functionality of hardware (e.g., servers) and software resources of the cloud 210 and thus may act as a "cloud operating system." For example, the platform 212 may abstract resources to connect the computing device 102 with other computing devices. The platform 212 may also serve to abstract scaling of resources to provide a corresponding level of scale to encountered demand for the web services 214 that are implemented via the platform 212. A variety of other examples are also contemplated, such as load balancing of servers in a server farm, protection against malicious parties (e.g., spam, viruses, and other malware), and so on. Thus, the cloud 210 is included as a part of the strategy that pertains to software and hardware resources that are made available to the computing device 102 via the Internet or other networks.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on or by a processor (e.g., CPU or CPUs). The program code can be stored in one or more computer readable memory devices. The features of the gesture techniques described below are platform-independent, meaning that the techniques may be implemented on a variety of commercial computing platforms having a variety of processors.

Having described example operating environments in which various embodiments can be utilized, consider now a discussion of on-demand scalable timer wheels in accordance with one or more embodiments.

On-Demand Scalable Timer Wheels

Timer wheels can be used by computing devices as a way to efficiently process multiple timers. Among other things, grouping timers together can reduce processing overhead by distributing a set amount of overhead over the group of timers, instead of incurring that same set overhead for each timer. To further illustrate, consider FIG. 3, which includes example timer wheel 302. Here, timer wheel 302 has twelve separate time slots, ranging from 0-11. It is to be appreciated that the value of twelve is an arbitrary value, and is used here merely for discussion purposes. Any suitable number of time slots can be utilized without departing from the spirit of the claimed subject matter. Further, assume each time slot represents a time unit of 4 seconds (e.g. one full rotation of timer wheel 302 takes 12×4=48 seconds). However, as in the case of the number of time slots, it is to be appreciated that any suitable length of time can be used for a time slot, such as 1 millisecond, 100 milliseconds, 1 second, 30 seconds, and so forth.

Timer wheel 302 is illustrated here as a circular structure and/or a circular array. This circular structure is intended to show the continuous nature of timer wheel 302. For instance, as discussed above, a full rotation of timer wheel 302 completes in 48 seconds. After reaching the end of a full rotation, timer wheel 302 advances to the last time slot (here, time slot 11) to the beginning time slot (time slot 0). This process can, in some cases, repeat itself indefinitely until timer wheel 302 is removed, destructed, and/or deleted.

Figure 3:
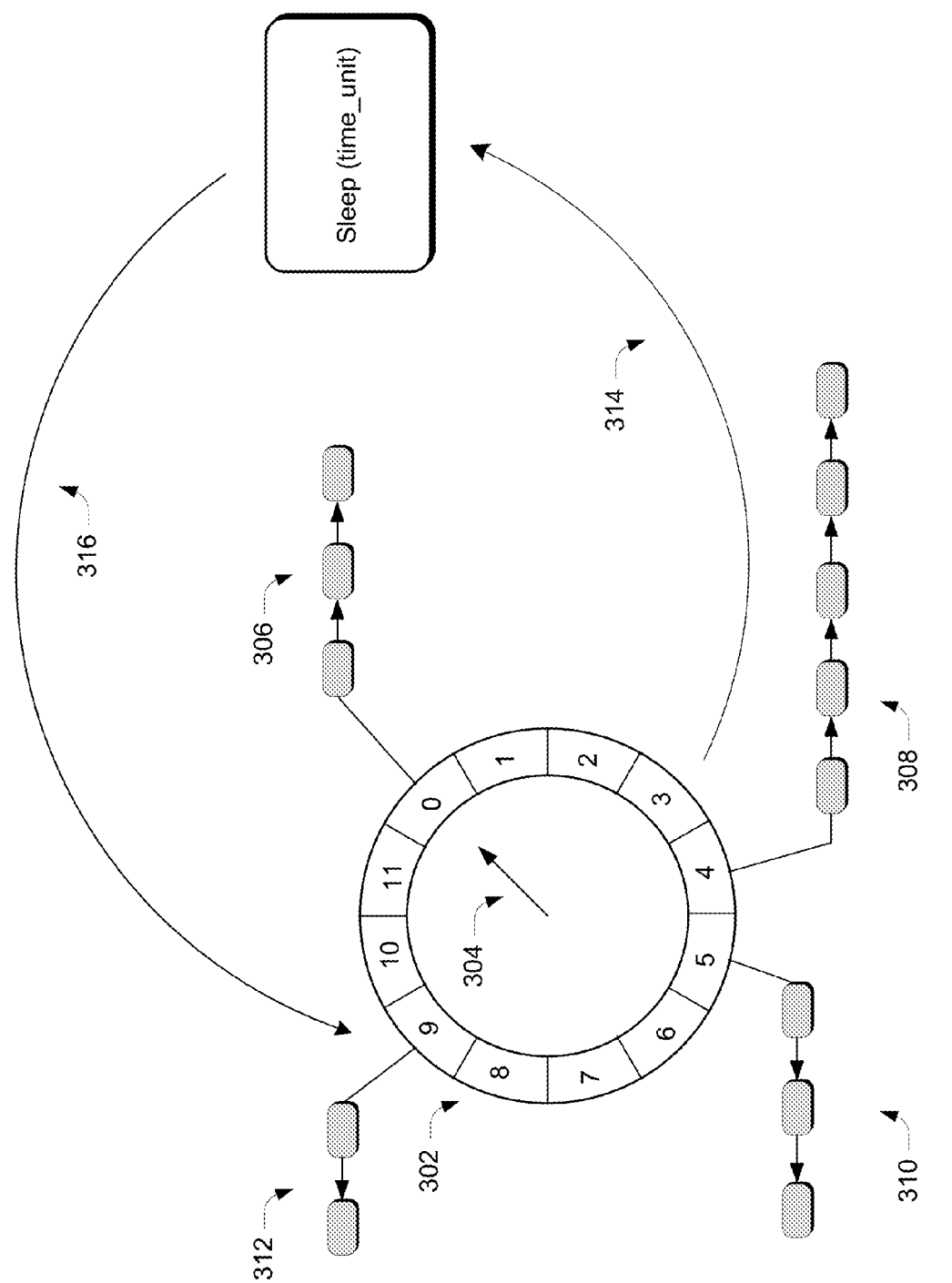
FIG. 3 is an illustration of an example timer wheel diagram in accordance with one or more embodiments

FIG. 3 also includes pointer 304, which is used to figuratively indicate which time slot of timer wheel 302 is the active time slot. However, identifying an active time slot can be managed in any suitable manner, such as through an index value, an array pointer, and so forth. Here, pointer 304 is directed towards time slot 0, thus indicating that time slot 0 is the currently active time slot. As time progresses, the active time slot transitions to the next time slot. Figuratively, this would be indicated as pointer 304 advancing to the next time slot (e.g. either the timer wheel remains fixed and the pointer rotates clockwise, or the pointer remains fixed, and the timer wheel rotates counter-clockwise). However, this advancement can be indicated in any suitable manner, such as through an index value incrementing, an array pointer incrementing, and so forth. In this example, timer wheel 302 advances its active time slot from time slot 0 to time slot 1, then advances from time slot 1 to time slot 2, and so forth. As described above, when the active time slot is time slot 11, timer wheel 302 transitions from time slot 11 to time slot 0, and the process repeats.

Advancing to a new active time slot results in processing and/or servicing any timers associated with the active time slot. This can include calling any callback functions associated with a timer and/or passing the associated callback functions to a separate task for execution. Further, multiple timers can be assigned and/or added to a time slot. Thus, in some cases, multiple time slots have multiple timers assigned to them. Consider time slot 0 which includes 3 separate timers, indicated here as timers 306. When time slot 0 becomes the active time slot, timers 306 are serviced and/or are processed. In some cases, timer wheel 302 services each timer of timers 306. Here, timers 306 represent any active timers in time slot 0 in need of servicing. This can imply all timers associated with time slot 0 or only some timers associated with time slot 0. It is to be appreciated and understood that time slot 0 could have additional timers associated with it that are not in need of servicing at this point in time (but rather on subsequent passes at time slot 0). Alternately or additionally, timer wheel 302 can pass the servicing and/or processing of timers to a different task. In this example, time slots 4, 5, and 9 of timer wheel 302 include timers 308, 310, and 312 respectively. Thus, as timer wheel 302 advances into the associated time slot, the associated timers are serviced (e.g. when timer wheel 302 transitions into time slot 4, timers 308 are serviced, when timer wheel 302 transitions into time slot 5, timers 310 are serviced, etc.). While each time slot is illustrated with a particular group size of timers (e.g. 2 timers, 3 timers, 5 timers), it is to be appreciated and understood that any suitable number of timers can be grouped without departing from the scope of the claimed subject matter. As part of a transition into a time slot, some embodiments lock access to the time slot that is being serviced until the time slot time has expired and/or all timers have been serviced.

If timer wheel 302 has completed servicing (and/or facilitating the servicing of) the associated timers of a time slot, but it is not time to transition to the next time slot, timer wheel 302 temporarily suspends itself until the next time slot. For example, after servicing timers 306 associated with time slot 0, timer wheel 302 temporarily transitions into a sleep mode, indicated here by transition 314. Further, timer wheel 302 is suspended for a "time_unit" amount of time, which is meant to generically indicate an amount of time until the start of the next time slot. Upon completing its "time_unit" suspension and/or sleeping period, timer wheel 302 resumes its activities and transitions to the next time slot, illustrated here as transition 316. Thus, in this example, timer wheel 302 first identifies time slot 0 as the active time slot, services (and/or facilitates servicing) timers 306, and then transitions to a sleep state until a point in time when time slot 1 begins. When time slot 1 becomes the active time slot, timer wheel 302 resumes its execution, and searches for any associated timers with the active time slot. In some cases, this process repeats until timer wheel 302 is terminated. While grouping timers in this fashion can make processing a multitude of timers more efficient, the continuous nature of a timer wheel can sometimes cause unnecessary processing.

Consider, a timer wheel that services all associated timers, and becomes void of any timers. Due to the continuous nature of the timer wheel, it would continue to wake up at the start of each time slot and search for any associated timers. However, no timers would be found, and the timer would transition into a sleep mode until the start of the next time slot. Thus, even though there are no timers to be serviced, the timer wheel would continue to wake up, check for timers, and then transition back to sleep. This unnecessary processing can not only take up valuable CPU processing time, but additionally drain valuable battery life of a device running the timer wheel.

Figure 4:
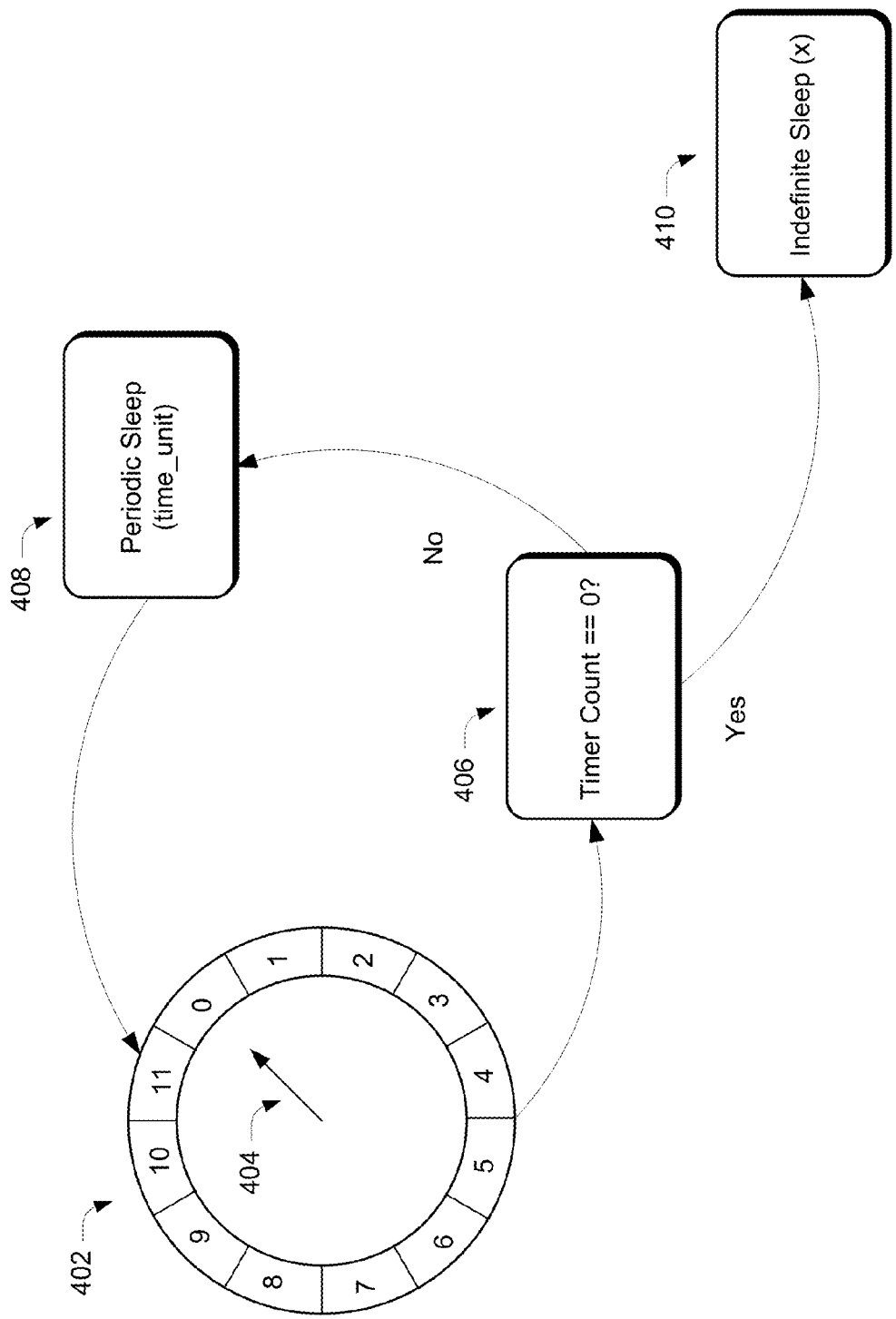
FIG. 4 is an illustration of an example timer wheel diagram in accordance with one or more embodiments.

Various embodiments enable on-demand scaling of a timer wheel. For example, a timer wheel can be instantiated for one or more applications. The instantiated timer wheel can then be dynamically started and stopped based, at least in part, on whether the timer wheel has any associated active timers. Alternately or additionally, timers can be added to the timer wheel without the use of a global lock associated with the timer wheel. Consider FIG. 4, which illustrates example timer wheel 402. As in the case of timer wheel 302 in FIG. 3, timer wheel 402 is a circular timer wheel containing 12 time slots, labeled 0-11 respectively. Similarly, FIG. 4 includes pointer 404, which is used to identify which time slot is the currently active time slot (here, time slot 0).

When timer wheel 402 contains one or more timer associations, it is configured to run in a manner similar to timer wheel 302 described above (e.g. periodically wake up at each time slot to process and/or service any associated timers of that time slot). Here, however, timer wheel 402 is void of any associated timers, thus implying that each time slot has been "emptied". A timer wheel and/or time slot can manage its associated timers in any suitable manner. In some embodiments, timer wheel 402 maintains one or more internal lists of timers for each time slot. The internal lists can account for each timer associated with the respective time slot in any suitable manner, such as through a reference and/or pointer to each timer. As a timer is serviced, the reference can be removed from the internal list. Alternately or additionally, timer wheel 402 can maintain a count of active timers, as further discussed below.

In some embodiments, timer wheel 402 maintains knowledge of when timers are assigned and/or added to the timer wheel, as well as when timers are, removed from and/or disassociated with the timer wheel. For instance, timer wheel 402 can maintain an atomic counter that tracks when timers are added and removed from timer wheel 402. In some cases, there can be a plurality of atomic counters, where each atomic counter is associated with a time slot (e.g. each time slot of the timer wheel has a uniquely associated atomic counter). Among other things, an atomic counter enables "locked" read and writes to the counter. In a multi-threaded environment, multiple tasks can potentially attempt to access the counter simultaneously. An atomic counter prevents the value from changing in the middle of a read or write by implementing a read and/or write action in (virtually) a single execution. This ensures that the counter value is not modified in the middle of the read or write (which, in turn, alleviates potential race conditions and/or lock ups on a computing device). In this example, when a timer is added to any of the time slots of timing wheel 402, the associated atomic counter is incremented. Similarly, when a timer is serviced and/or removed from any of the time slots of timing wheel 402, the atomic counter is decremented.

After timer wheel 402 has completed servicing the timers associated with the active time slot, some embodiments check an associated counter (e.g., an atomic counter) to determine whether timer wheel 402 contains any timers, illustrated here as timer wheel 402 transitioning to decision state 406. If the counter reflects that timer wheel 402 contains timers in need of (eventual) servicing, timer wheel 402 then transitions to periodic sleep state 408. In this illustration, periodic sleep state 408 represents a state in which timer wheel 402 temporarily suspends its execution for a "time_unit" amount of time as further discussed above. Periodic sleep state 408 is "periodic" due to the continuous nature of timer wheel 402, as also discussed above. If, however, decision state 406 determines that timer wheel 402 is void of timers in need of (eventual) servicing, timer wheel 402 instead transitions to indefinite sleep state 410.

Indefinite sleep state 410 represents a state in which timer wheel 402 suspends its execution for an indefinite amount of time. Since it has been determined there are no timers associated with timer wheel 402, the need to periodically wake up to check for and/or service timers on each time slot no longer exists. As such, processing power and/or the battery life of the executing computing device can be preserved by suspending unnecessary activity. In some cases, timer wheel 402 can suspend its periodic activities indefinitely and/or until new timers are added. The term "indefinite" here is used to describe an unknown amount of time. For example, it could imply 10 seconds, 1 hour, and the like. In some embodiments, adding a new timer to a time slot of timer wheel 402 can reactive timer wheel 402 and/or restart the periodic process of moving from time slot to time slot and checking for timers. Since a new timer could be added at any point in time after timer wheel 402 enters into indefinite sleep state 410, it is undeterminable how long indefinite sleep state 410 might last. Thus, "indefinite" implies an unknown amount of time with a wide range of possibilities.

Figure 5:
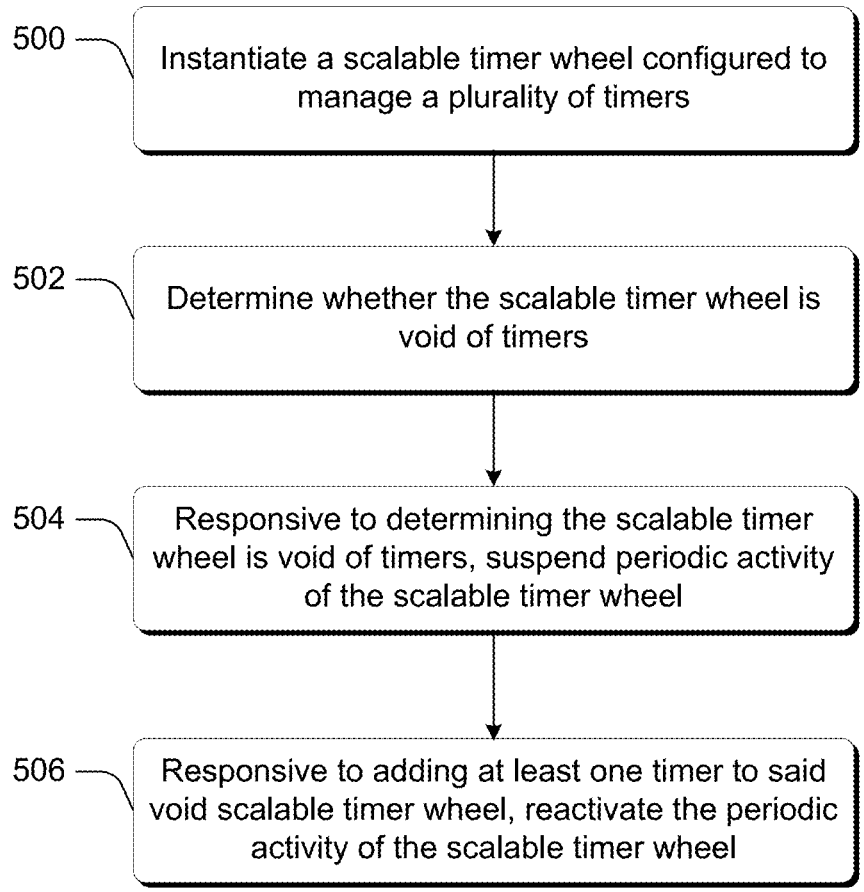
FIG. 5 illustrates a flow diagram in accordance with one or more embodiments.

To further illustrate, consider FIG. 5, which illustrates a flow diagram that describes steps in a method in accordance with one or more embodiments. The method can be performed by any suitable hardware, software, firmware, or combination thereof. In at least some embodiments, aspects of the method can be implemented by one or more suitably configured software modules executing on one or more computing device, such as scalable timer wheel module 112 of FIG. 1.

Step 500 instantiates a scalable timer wheel configured to manage a plurality of timers. Here, the term "scalable" is used to indicate the scalable nature of the timer wheel's execution. As described above, the scalable timer wheel can be started and stopped on-demand based, at least in part, on whether the scalable timer wheel has any associated timers in need of servicing. In some embodiments, the scalable timer wheel contains multiple time slots and/or buckets into which timers are grouped. Alternately or additionally, the scalable timer wheel can be configured to suspend and start itself periodically as it transitions through each time slot, as further described above.

Step 502 determines whether the scalable timer wheel is void of timers. For example, an atomic counter can be used to monitor when timers are added to the scalable timer wheel and when timers are removed from the scalable timer wheel.

Responsive to determining the scalable timer wheel is void of timers, step 504 suspends periodic activity of the scalable timer wheel. This can include any periodic activity associated with suspending and waking the scalable timer wheel related to servicing each of the time slots, as further discussed above. Alternately or additionally, the scalable timer wheel can be suspended of all activity for an indefinite amount of time.

Responsive to adding at least one timer to said void scalable timer wheel, step 506 reactivates the periodic activity of the scalable timer wheel. This can include any suitable type of activity, such as periodic activity associated with monitoring any time slots associated with the scalable timer wheel and/or servicing timers.

Having considered a discussion of on-demand scalable timer wheels, consider now a discussion of an example device that can be utilized to implement the embodiments described above.

Example Device

Figure 6:
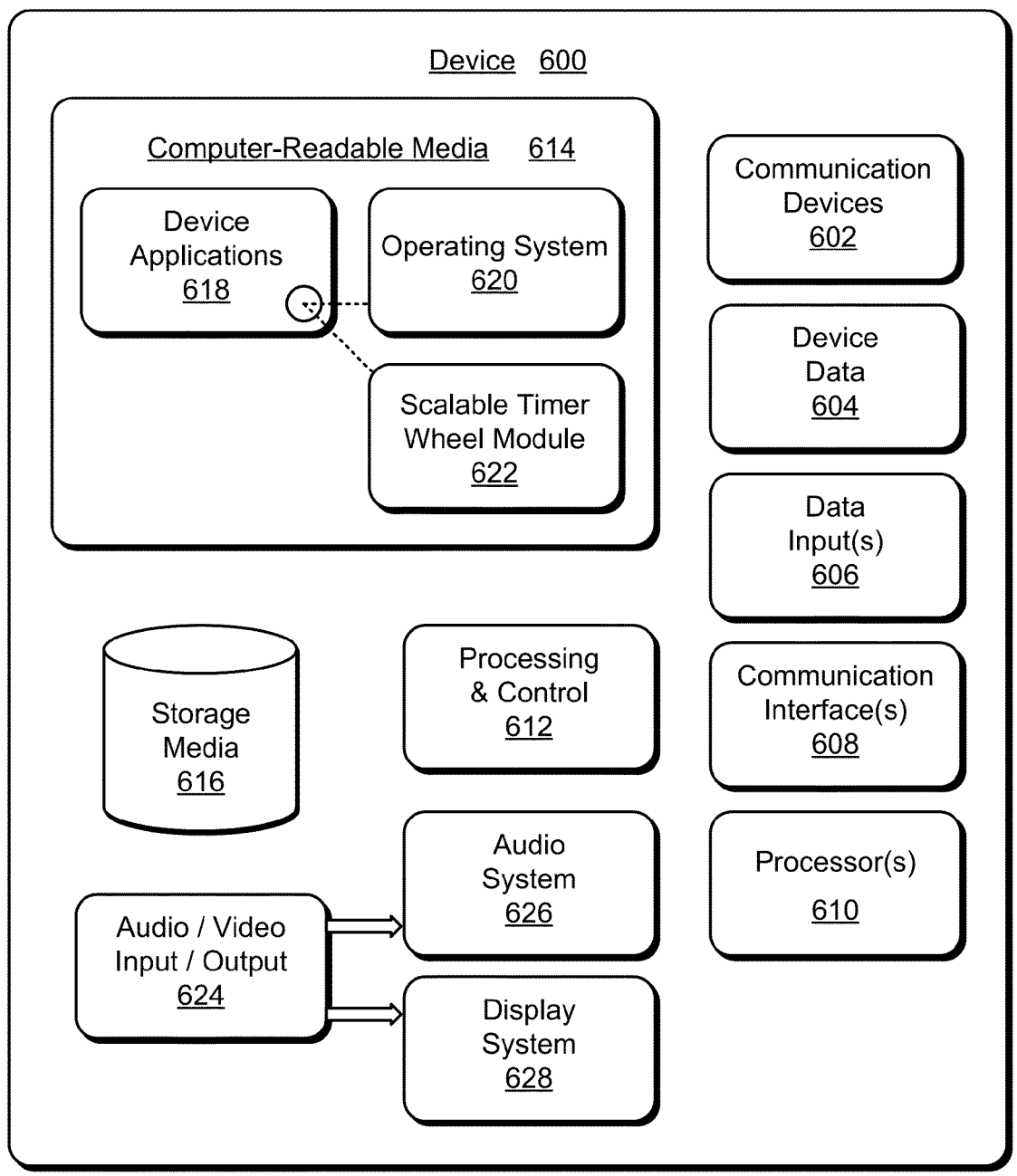
FIG. 6 illustrates an example computing device that can be utilized to implement various embodiments described herein.

FIG. 6 illustrates various components of an example device 600 that can be implemented as any type of portable and/or computer device as described with reference to FIGS. 1 and 2 to implement embodiments of on-demand scalable timer wheels described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable or readable instructions to control the operation of device 600 and to implement the embodiments described above. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.), as well as other applications that can include, web browsers, image processing applications, communication applications such as instant messaging applications, word processing applications and a variety of other different applications. The device applications 618 also include any system components or modules to implement embodiments of the techniques described herein. In this example, the device applications 618 include scalable timer wheel module 622 that is shown as a software module and/or computer application. Scalable timer wheel module 622 is representative of software that is used to dynamically start and stop execution of a timer wheel based, at least in part, on determining whether the timer wheel is void of timers, as further described above. Alternatively or in addition, scalable timer wheel module 622 can be implemented as hardware, software, firmware, or any combination thereof.

Device 600 also includes an audio and/or video input-output system 624 that provides audio data to an audio system 626 and/or provides video data to a display system 628. The audio system 626 and/or the display system 628 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 626 and/or the display system 628 are implemented as external components to device 600. Alternatively, the audio system 626 and/or the display system 628 are implemented as integrated components of example device 600.

CONCLUSION

Various embodiments enable on-demand scaling of a timer wheel. Some embodiments dynamically start and stop a timer wheel based, at least in part, on whether the timer wheel has any associated active timers. In some cases, the timer wheel is suspended when all associated active timers have been serviced. Alternately or additionally, the timer wheel is re-activated upon associating one or more active timers in need of service to the timer wheel. Various embodiments enable addition and removal of timer(s) to the timer wheel and/or various time slots associated with the timer wheel without using a global lock associated with the timer wheel Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
   instantiating a scalable timer wheel configured to manage a plurality of timers;
   determining whether the scalable timer wheel is void of timers;
   responsive to determining the scalable timer wheel is void of timers, suspending periodic activity of the scalable timer wheel;
   responsive to adding at least one timer to said void scalable timer wheel, reactivating the periodic activity of the scalable timer wheel; and
   assigning at least one timer to at least one time slot associated with the scalable timer wheel,
   wherein determining whether the scalable timer wheel is void of timer comprises utilizing an atomic counter configured to track when the at least one timer is assigned to the at least one time slot and when the at least one timer is disassociated with the at least one time slot.

2. The computer-implemented method of claim 1, wherein the periodic activity comprises:
   identifying an active time slot from of a plurality of time slots associated with the scalable timer wheel;
   identifying any timers associated with the active time slot;
   enabling servicing of each of said identified timers associated with the active time slot; and
   temporarily suspending execution of the scalable timer wheel until a next time slot becomes the active time slot.

3. The computer-implemented method of claim 2, wherein enabling servicing each of said identified timers further comprises passing an associated callback function to a separate task for execution.

4. The computer-implemented method of claim 1, wherein suspending the periodic activity of the scalable timer wheel comprises suspending the scalable timer wheel indefinitely.

5. The computer-implemented method of claim 1, wherein the periodic activity comprises:
   identifying an active time slot from of plurality of time slots associated with the scalable timer wheel;
   identifying any timers associated with the active time slot;
   enabling servicing of each of said identified timers associated with the active time slot; and
   temporarily suspending execution of the scalable timer wheel until a next time slot becomes the active time slot,
   wherein enabling servicing each of said identified timers further comprises passing an associated callback function to a separate task for execution,
   wherein suspending the periodic activity of the scalable timer wheel comprises suspending the scalable timer wheel indefinitely.

6. The computer-implemented method of claim 5, wherein the scalable timer wheel comprises a circular array timer wheel.

7. One or more computer-readable storage memory comprising processor-executable instructions which, responsive to execution by at least one processor, are configured to:
   instantiate a scalable timer wheel configured to manage a plurality of timers;
   determine whether the scalable timer wheel is void of timers;
   responsive to determining the scalable timer wheel is void of timers, suspend periodic activity of the scalable timer wheel;
   responsive to adding at least one timer to said void scalable timer wheel, reactivate the periodic activity of the scalable timer wheel; and
   assign at least one timer to at least one time slot associated with the scalable timer wheel,
   wherein the processor-executable instructions to determine whether the scalable timer wheel is void of timer are further configured to utilize an atomic counter configured to track when the at least one timer is assigned to the at least one time slot and when the at least one timer is disassociated with the at least one time slot.

8. The one or more computer-readable storage memory of claim 7, wherein the periodic activity comprises processor-executable instructions configured to:
   identify an active time slot from of a plurality of time slots associated with the scalable timer wheel;
   identify any timers associated with the active time slot;
   enable servicing of each of said identified timers associated with the active time slot; and
   temporarily suspend execution of the scalable timer wheel until a next time slot becomes the active time slot.

9. The one or more computer-readable storage memory of claim 8, wherein the processor-executable instructions to enable servicing each of said identified timers further comprise instructions configured to pass an associated callback function to a separate task for execution.

10. The one or more computer-readable storage memory of claim 7, wherein the processor-executable instructions to suspend the periodic activity of the scalable timer wheel are further configured to suspend the scalable timer wheel indefinitely.

11. The one or more computer-readable storage memory of claim 7, wherein the scalable timer wheel comprises a circular array timer wheel.

12. The one or more computer-readable storage memory of claim 7, wherein the periodic activity comprises processor-executable instructions configured to:
   identify an active time slot from of a plurality of time slots associated with the scalable timer wheel;
   identify any timers associated with the active time slot;
   enable servicing of each said identified timers associated with the active time slot; and
   temporarily suspend execution of the scalable timer wheel until a next time slot becomes the active time slot,
   wherein the processor-executable instructions to enable servicing each of said identified timers further comprise instructions configured to pass an associated callback function to a separate task for execution,
   wherein the processor-executable instructions to suspend the periodic activity of the scalable timer wheel are further configured to suspend the scalable timer wheel indefinitely.

13. The one or more computer-readable storage memory of claim 12, wherein the scalable timer wheel comprises a circular array timer wheel.

14. A system comprising:
   at least one processor; and
   one or more computer-readable storage memory comprising processor-executable instructions which, responsive to execution by the at least one processor, are configured to:
      instantiate a scalable timer wheel configured to manage a plurality of timers;
      determine whether the scalable timer wheel is void of timers;
      responsive to determining the scalable timer wheel is void of timers, suspend periodic activity of the scalable timer wheel;
      responsive to adding at least one timer to said void scalable timer wheel, reactivate the periodic activity of the scalable timer wheel; and
      assign at least one timer to at least one time slot associated with the scalable timer wheel,
      wherein the processor-executable instructions to determine whether the scalable timer wheel is void of timer are further configured to utilize an atomic counter configured to track when the at least one timer is assigned to the at least one time slot and when the at least one timer is disassociated with the at least one time slot.

15. The system claim 14, wherein the periodic activity comprises processor-executable instructions configured to:
   identify an active time slot from of a plurality of time slots associated with the scalable timer wheel;
   identify any timers associated with the active time slot;
   enable servicing of each of said identified timers associated with the active time slot; and
   temporarily suspend execution of the scalable timer wheel until a next time slot becomes the active time slot.

16. The system claim 15, wherein the processor-executable instructions to enable servicing each of said identified timers further comprise instructions configured to pass an associated callback function to a separate task for execution.

17. The system claim 14, wherein the processor-executable instructions to suspend the periodic activity of the scalable timer wheel are further configured to suspend the scalable timer wheel indefinitely.

18. The system claim 14, wherein the scalable timer wheel comprises a circular array timer wheel.

19. The system claim 14, wherein the periodic activity comprises processor-executable instructions configured to:
   identify an active time slot from of a plurality of time slots associated with the scalable timer wheel;
   identify any timers associated with the active time slot;
   enable servicing of each of said identified timers associated with the active time slot; and temporarily suspend execution of the scalable timer wheel until a next time slot becomes the active time slot, wherein the processor-executable instructions to enable servicing each of said identified timers further comprise instructions configured to pass an associated callback function to a separate task for execution, wherein the processor-executable instructions to suspend the periodic activity of the scalable timer wheel are further configured to suspend the scalable timer wheel indefinitely.

20. The system of claim 19, wherein the scalable timer wheel comprises a circular array timer wheel.

* * * * *